(12) United States Patent
Bunko

(10) Patent No.: US 7,086,513 B2
(45) Date of Patent: Aug. 8, 2006

(54) ROTATION TRANSMISSION DEVICE

(75) Inventor: Hiroshi Bunko, Shizuoka (JP)

(73) Assignee: NTN Corporation, Osaka (JP)

( * ) Notice: Subject to any disclaimer, the term of this patent is extended or adjusted under 35 U.S.C. 154(b) by 112 days.

(21) Appl. No.: 10/952,799

(22) Filed: Sep. 30, 2004

(65) Prior Publication Data

US 2005/0121280 A1 Jun. 9, 2005

(30) Foreign Application Priority Data

Oct. 1, 2003 (JP) ............................. 2003-343334

(51) Int. Cl.
*F16D 41/08* (2006.01)
*F16D 27/10* (2006.01)
(52) U.S. Cl. ...................... 192/35; 192/38; 192/113.32
(58) Field of Classification Search ............... 192/84.8, 192/113.32
See application file for complete search history.

(56) References Cited

U.S. PATENT DOCUMENTS

| | | | |
|---|---|---|---|
| 6,244,403 B1 * | 6/2001 | Ito et al. ....................... | 192/35 |
| 6,766,888 B1 * | 7/2004 | Yasui et al. ................... | 192/35 |
| 2002/0170795 A1 * | 11/2002 | Yasui et al. ................... | 192/35 |

FOREIGN PATENT DOCUMENTS

| | | | |
|---|---|---|---|
| JP | 11-336799 A | * | 12/1999 |
| JP | 2001-165197 | | 6/2001 |
| JP | 2001-349344 A | * | 12/2001 |

* cited by examiner

*Primary Examiner*—Richard M. Lorence
(74) *Attorney, Agent, or Firm*—Wenderoth, Lind, & Ponack, L.L.P.

(57) ABSTRACT

A rotation transmission device includes an input member, an outer ring mounted around the input member, a two-way clutch and an electromagnetic clutch for selectively engaging and disengaging the two-way clutch, both clutches being mounted between the input member and the outer ring. The electromagnetic clutch includes an armature coupled to a retainer of the two-way clutch so as to be non-rotatable and axially movable relative to the retainer. By energizing its electromagnet, the armature is pulled toward the electromagnet until it is pressed against a rotor fixed to the outer ring. The input member is formed with an oil supply passage. Oil is supplied through the oil supply passage and an oil passage defined between the outer periphery of the input member and the inner periphery of the rotor into a space between the two clutches. The oil passage has a restricted, narrow portion to limit the amount of oil supplied into the above space. This prevents a rise in oil pressure in this space and thus prevents the armature from being pressed against the rotor and the two-clutch from engaging in an untimely manner.

5 Claims, 3 Drawing Sheets

ROTATION TRANSMISSION DEVICE

BACKGROUND OF THE INVENTION

The present invention relates to a rotation transmission device mounted in a power train of a vehicle for selectively permitting and prohibiting torque transfer.

Such a rotation transmission device is disclosed in unexamined JP patent publication 2001-165197. The rotation transmission device disclosed in this publication includes an inner shaft as an input member, an intermediate shaft provided around the inner shaft, and an outer shaft as an output member provided around the intermediate shaft. A two-way clutch and an electromagnetic clutch for selectively engaging and disengaging the two-way clutch are mounted between the inner shaft and the intermediate shaft, and another similar clutch pair is mounted between the intermediate shaft and the outer shaft.

The two-way clutch mounted between the inner shaft and the intermediate shaft comprises a cam non-rotatably mounted on the inner shaft and formed with a plurality of cam surfaces on its outer periphery, a plurality of rollers each received in a wedge-shaped space defined between a cylindrical surface formed on the inner periphery of the intermediate shaft and one of the cam surfaces, a retainer for retaining the rollers, and a switch spring for elastically biasing the retainer toward its neutral position where the rollers are not in engagement with at least either the cylindrical surface or the cam surfaces.

The two-way clutch mounted between the intermediate shaft and the outer shaft comprises a plurality of rollers each received in a wedge-shaped space defined between a cylindrical surface formed on the inner periphery of the outer shaft and cam surfaces formed on the outer periphery of the intermediate shaft, a retainer for retaining the rollers, and a switch spring for elastically biasing the retainer toward its neutral position where the rollers are not in engagement with at least either the cylindrical surface or the cam surfaces.

The electromagnetic clutches mounted between the inner shaft and the intermediate shaft and between the intermediate shaft and the outer shaft are of the same structure and each comprise an armature coupled to the retainer of the two-way clutch so as to be non-rotatable but axially movable relative to the retainer, a rotor axially fixed to the outer one of the two shafts between which the electromagnetic clutch is mounted so as to axially face the armature, and an electromagnet axially facing the armature with the rotor disposed therebetween. By energizing the electromagnet, the armature is attracted toward the electromagnet until it is pressed against the rotor. The retainer thus rotates relative to the inner one of the two shafts. The two-way clutch thus engages.

Another conventional rotation transmission device includes an input shaft, an outer ring as an output member provided around the input shaft, and a two-way clutch and an electromagnetic clutch similar to the above-mentioned clutch pair and mounted between the input shaft and the outer ring.

In any of these conventional rotation transmission devices, it is necessary to lubricate its two-way clutch or clutches. One way to lubricate such a two-way clutch would be to seal grease in the device. But because the components of the rotation transmission device rotate at high speeds, the sealed grease tends to move radially outwardly under centrifugal force and leak from the device. The grease is thus lost soon, leaving the two-way clutches unlubricated. Thus, such a two-way clutch is typically lubricated by supplying oil through an oil supply passage formed in the input member into the space between the two-way clutch and the electromagnetic clutch.

In this arrangement, oil tends to be supplied into the space between the two-way clutch and the electromagnetic clutch at a higher rate than the rate at which oil is discharged from this space. Thus, the pressure of oil in this space tends to rise. Increased oil pressure in this space may act to move the armature toward the rotor and actually press the former against the latter when the electromagnet is not energized, thus undesirably engaging the two-way clutch. Conversely, while the electromagnet is being energized, increased oil pressure in the space between the two clutches may act to push the armature away from the rotor against the magnetic force produced by the electromagnet. This may cause the two-way clutch to be disengaged in an untimely manner for a short period of time. In either case, the two-way clutch cannot be controlled in a stable and reliable manner.

An object of the present invention is to provide a rotation transmission device having means for preventing a rise in oil pressure in the device, thereby preventing the armature of the electromagnetic clutch from being pressed against or separated from the rotor.

SUMMARY OF THE INVENTION

According to the invention, there is provided a rotation transmission device comprising an input member, an output member provided around the input member through a bearing disposed at one end of the output member so as to be rotatable relative to the input member, a two-way clutch disposed between the input member and the output member, and an electromagnetic clutch disposed between the input member and the output member for selectively engaging and disengaging the two-way clutch, the two-way clutch being a mechanical clutch comprising a plurality of engaging elements, a retainer for retaining the engaging elements, and a switch spring biasing the retainer toward a neutral position where the engaging elements are not in engagement with at least one of the input member and the output member, the electromagnetic clutch comprising an armature coupled to the retainer so as to be non-rotatable but axially movable relative to the retainer, a rotor fixed to the output member so as to be non-rotatable relative to the output member and to axially face the armature, and an electromagnet axially facing the armature with the rotor disposed between the electromagnet and the armature, the electromagnet being selectively energized to pull the armature toward the electromagnet until the armature is pressed against the rotor, the input member being formed with an oil supply passage having an outlet port directly or indirectly communicating with a space defined between the two-way clutch and the electromagnetic clutch, whereby oil is supplied through the oil supply passage and the outlet port into the space to lubricate the two-way clutch, the rotation transmission device further including a pressure rise suppressor for preventing a rise in the pressure of oil supplied into the space through the oil supply passage.

In one arrangement, the outlet port communicates with the space through an oil passage defined between an outer peripheral surface of the input member and an inner peripheral surface of the rotor, the pressure rise suppressor comprising a restricted portion of the oil passage, the restricted portion being provided between the outlet port and the space and having a reduced sectional area.

In a specific embodiment, a needle roller bearing is mounted in the oil passage between the outlet port and the space for keeping the input member and the rotor rotatable relative to each other, the needle roller bearing including an outer ring having a flange extending toward the outer peripheral surface of the input shaft, wherein the restricted portion is a gap defined between a radially inner edge of the flange and the outer peripheral surface of the input shaft.

Alternatively, the pressure rise suppressor may comprise an oil discharge port formed in the output member and communicating with the space, the oil discharge port having a greater diameter than the outlet port.

The pressure rise suppressor prevents a rise in the oil pressure in the space between the two clutches, thereby preventing the armature of the electromagnetic clutch from being pressed against or separated from the rotor. The two-way clutch can thus be controlled accurately and reliably.

BRIEF DESCRIPTION OF THE DRAWINGS

Other features and objects of the present invention will become apparent from the following description made with reference to the accompanying drawings, in which.

DETAILED DESCRIPTION OF THE PREFERRED EMBODIMENTS

Figure 1:
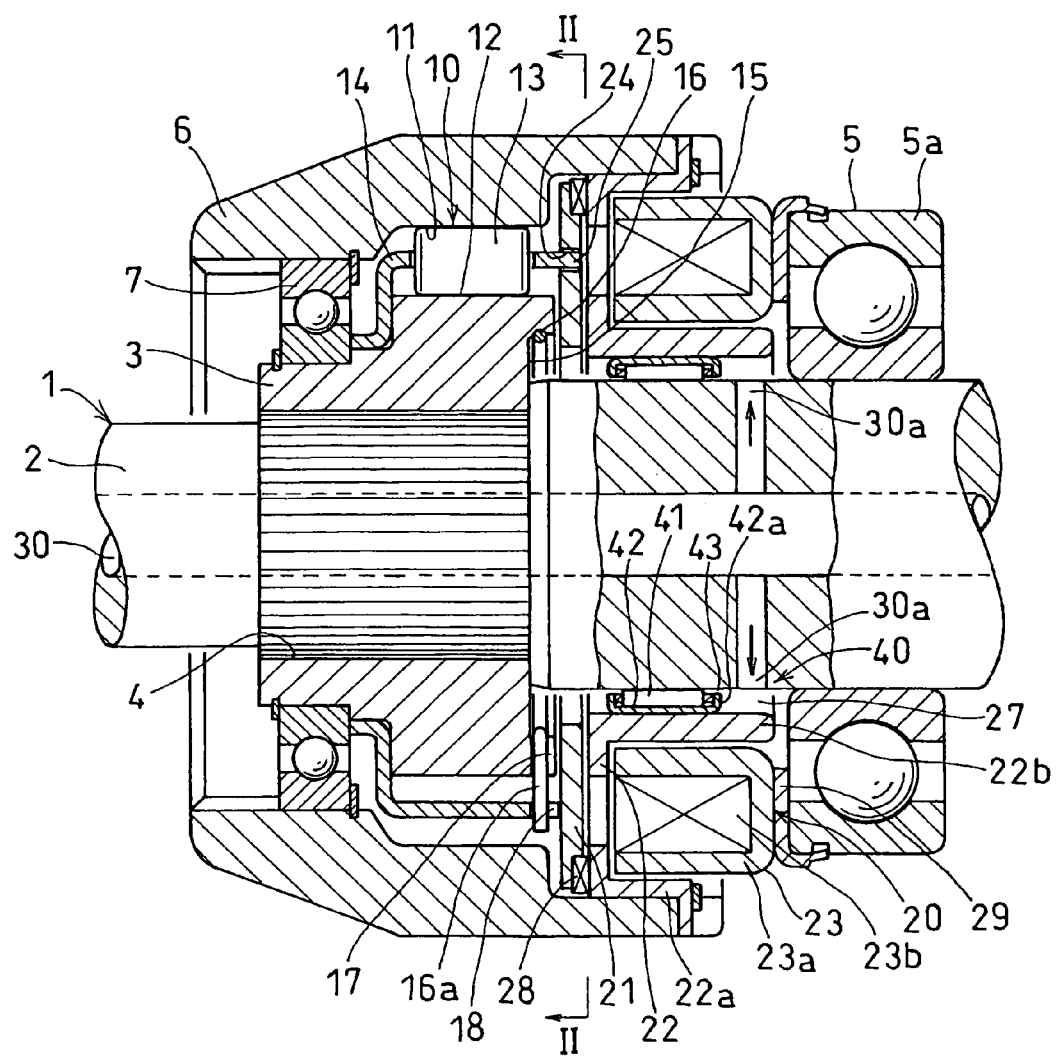
FIG. 1 is a front view in longitudinal section of a rotation transmission device of a first embodiment according to the present invention.
Figure 2:
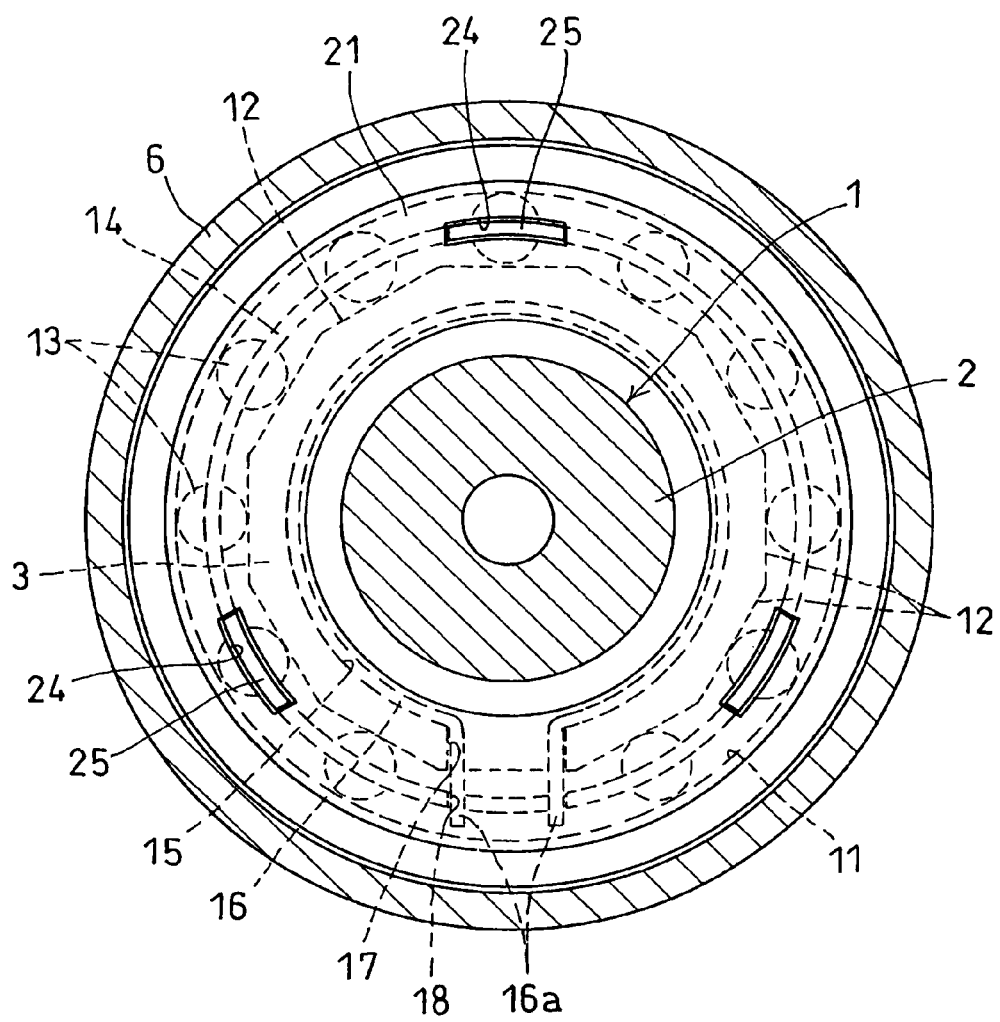
FIG. 2 is a sectional view taken along line II—II of FIG. 1.

Now referring to the drawings, FIGS. 1 and 2 show a rotation transmission device of the first embodiment according to the present invention. It includes an input member 1 comprising an input shaft 2 and a cam ring 3 non-rotatably mounted on the input shaft 2 through serrations 4.

The input member 1 is rotatably supported by a stationary member (not shown) through a bearing 5. An outer ring 6 as an output member is mounted around the input member 1. The outer ring 6 and the input member 1 are rotatably supported by each other through a bearing 7 disposed therebetween at one end of the outer ring 6. Further disposed between the input member 1 and the outer ring 6 are a two-way clutch 10 which can be selectively engaged and disengaged, and an electromagnetic clutch 20 for selectively engaging and disengaging the two-way clutch 10.

The two-way clutch 10 comprises a plurality of rolling elements 13 in the form of rollers each received in a wedge-shaped space defined between a cylindrical surface 11 formed on the inner periphery of the outer ring 6 and one of a plurality of cam surfaces 12 formed on the outer periphery of the cam ring 3, and a roller retainer 14 disposed between the cam ring 3 and the outer ring 6 to retain the engaging elements 13.

A substantially C-shaped switch spring 16 is received in a spring-receiving recess 15 formed in one end face of the cam ring 3 (FIG. 2). At both ends, the switch spring 16 has radially outwardly extending protrusions 16a received in a cutout 17 formed in the outer wall of the recess 15 of the cam ring 3 and a cutout 18 formed in an end face of the retainer 14 to bias the circumferentially opposed end faces of each of the cutouts 17 and 18 in opposite rotational directions. The switch spring 16 thus elastically keeps the retainer 14 in its neutral position in which the engaging elements 13 are out of engagement with at least either the cylindrical surface 11 of the outer ring 6 or the cam surfaces 12 of the cam ring 3. When the retainer 14 rotates in either direction from the neutral position relative to the input member 1, the engaging elements 13 will engage both of the cylindrical surface 11 and the cam surfaces 12, thereby non-rotatably coupling the input member 1 and the outer ring 6 together.

The electromagnetic clutch 20 comprises an armature 21 axially facing the retainer 14, a rotor 22 axially facing the armature 21, and an electromagnet 23 axially facing the rotor 22.

The armature 21 is formed with a plurality of holes 24 arranged circumferentially at equal angular intervals (FIG. 2). The retainer 14 has projections 25 axially protruding from its end facing the armature 21 and each received in one of the holes 24 formed in the armature 21. The armature 21 is thus non-rotatable but axially movable relative to the retainer 14.

The rotor 22 is made of a magnetizable material and comprises a radially outer cylindrical portion 22a and a radially inner cylindrical portion 22b. The outer cylindrical portion 22a is fitted in one end of the outer ring 6 so as to be non-rotatable relative to the outer ring 6, while the inner cylindrical portion 22b is disposed around the input shaft 2 with an annular oil passage 27 defined therebetween. A separation spring 28 is provided between the rotor 22 and the armature 21 to bias the armature 21 axially away from the rotor 22.

The electromagnet 23 comprises a field core 23a and a coil 23b wound on the field core 23a. The field core 23a is coupled to a non-rotatable outer ring 5a of the bearing 5 through a connecting plate 29.

An oil supply passage 30 is axially formed in the input shaft 2 with its outlet ports 30a communicating with the oil passage 27. Oil is supplied through the oil supply passage 30 into the oil passage 27. Oil supplied into the passage 27 partially flows rightwardly in FIG. 1 to lubricate the bearing 5. The remaining oil flows leftwardly through the space between the two-way clutch 10 and the electromagnetic clutch 20 into the two-way clutch 20 to lubricate it and is then discharged.

When the electromagnetic coil 23b of the electromagnet 23 is energized with the input member 1 in a rotatable state, the armature 21 is attracted toward the coil 23 against the force of the separation spring 28 until it is pressed against the rotor 22.

The frictional torque produced between the armature 21 and the rotor 22 in this state is set at a greater value than the force of the switch spring 16. Thus, if there exists even the slightest rotational speed difference between the outer ring 6 and the input member 1 in this state, the retainer 14 and the input member 1 will rotate relative to each other against the force of the switch spring 16, causing the engaging elements 13 to wedge into narrow ends of the wedge spaces defined between the cylindrical surface 11 and the cam surfaces 12. Torque is thus transferred from the input member 1 to the outer ring 6 through the engaging elements 13, or vice versa.

While torque is transmitted from the input member 1 to the outer ring 6 through the engaging elements 13, when the coil 23b of the electromagnet 23 is deenergized, the retainer 14 will rotate back to its neutral position, i.e. the position where the engaging elements 13 disengage from at least either the cylindrical surface 11 or the cam surfaces 12 under the force of the switch spring 16. Torque is now not transferred to the outer ring 6, so that the input member 1 idles.

As described above, oil is supplied through the oil supply passage 30 and the oil passage 27 into the space between the two-way clutch 10 and the electromagnetic clutch 20 to lubricate the two-way clutch 10 and the bearing 7.

If the amount of oil supplied into the space between the two clutches 10 and 20 is greater than the amount of oil leaving this space, the oil pressure in this space will rise. If such pressure rise occurs while the input member 1 is idling, i.e. while the two-way clutch 10 is disengaged, the oil pressure in this space may act to bias the armature 21 toward the rotor 22. This may cause the armature 21 to be actually pressed against the rotor 22. If this happens, due to frictional resistance between the armature 21 and the rotor 22, the retainer 14 may rotate relative to the input member 1, thus causing the engaging elements 13 to engage the cylindrical surface 11 and the cam surfaces 12.

If the oil pressure in the space between the clutches 10 and 20 rises while the coil 23b is being energized and thus the clutch 10 is engaged, the oil pressure in this space may act to bias the armature 21 away from the rotor 22 against the electromagnetic force produced by the coil 23b. If the armature 21 actually separates from the rotor 22, this may cause untimely disengagement of the clutch 10. In either case, it becomes impossible to reliably control the two-way clutch 10 by selectively energizing and deenergizing the electromagnetic clutch 20.

Thus, the rotation transmission device according to the present invention is provided with a pressure rise suppressor arrangement 40 for preventing such unfavorable rise in the oil pressure in the space between the clutches 20 and 30.

The pressure rise suppressor arrangement 40 of the first embodiment comprises a needle roller bearing 41 mounted in the oil passage 27 between the armature 21 and the outlet ports 30a of the oil supply passage 30 so as to rotatably support the rotor 22 relative to the input shaft 2. The needle roller bearing 41 includes an outer ring 42 having radially inwardly extending flanges 42a at both ends thereof. Between the radially inner edges of the flanges 42a and the outer periphery of the input shaft 2, narrow, restricted passages 43 are defined. The passages 43 serve to restrict the flow of oil through the passage 27 into the space between the clutches 10 and 20, thereby preventing oil from flowing into the space between the clutches 10 and 20 in an amount greater than the amount of oil leaving this space.

This prevents a rise in the oil pressure in the space between the two-way clutch 10 and the electromagnetic clutch 20, which in turn prevents untimely engagement and disengagement of the two-way clutch 10. Thus, the reliability of the rotation transmission device improves.

Figure 3:
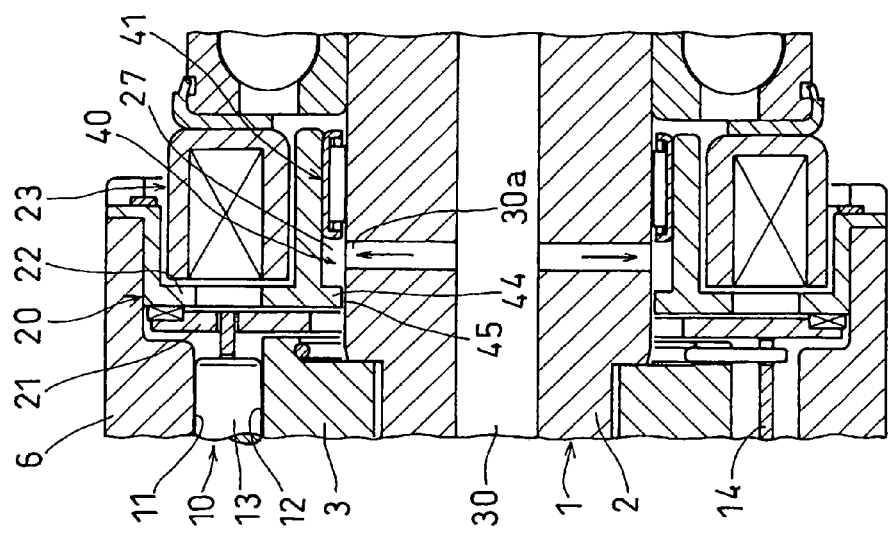
FIG. 3 is a partial sectional view of a second embodiment, showing another pressure rise suppressor arrangement.

The pressure rise suppressor arrangement 40 of the second embodiment, shown in FIG. 3, comprises an annular flange 44 radially inwardly protruding from the inner periphery of the radially inner cylindrical portion 22b of the rotor 22 at a position between the armature 21 and the needle roller bearing 41. In this embodiment, the outlet ports 30a of the oil supply passage 30 are provided between the needle roller bearing 41 and the annular flange 44. Between the radially inner edge of the flange 44 and the outer periphery of the input shaft 2, a narrow, restricted passage 45 is defined. The passage 45 serves to restrict the flow of oil through the passage 27 into the space between the clutches 10 and 20, thereby preventing oil from flowing into the space between the clutches 10 and 20 in an amount greater than the amount of oil leaving this space. This prevents a rise in the oil pressure in the space between the two-way clutch 10 and the electromagnetic clutch 20. This in turn prevents untimely engagement and disengagement of the two-way clutch 10. Thus, the reliability of the rotation transmission device improves.

Figure 4:
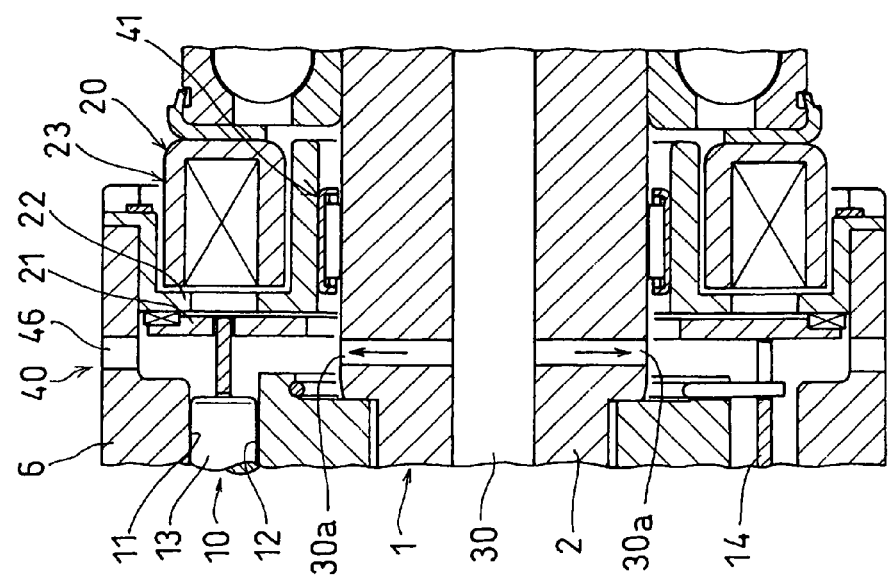
FIG. 4 is a similar view of a third embodiment, showing still another pressure rise suppressor arrangement.

The pressure rise suppressor arrangement 40 of the third embodiment, shown in FIG. 4, comprises outlet ports 30a of the oil supply passage 30 that directly communicate with the space between the two-way clutch 10 and the electromagnetic clutch 20 and a plurality of oil discharge ports 46 formed in the outer ring 6 so as to directly communicate with the space between the clutches 20 and 30 and having a greater diameter than the ports 30a.

Oil supplied into the space between the two-way clutch 10 and the electromagnetic clutch 20 through the ports 30a smoothly flows radially outwardly toward the ports 46 under centrifugal force and can be discharged smoothly through the ports 46 because the ports 46 have a greater diameter than the ports 30a.

This prevents a rise in the oil pressure in the space between the two-way clutch 10 and the electromagnetic clutch 20, which in turn prevents untimely engagement and disengagement of the two-way clutch 10. Thus, the reliability of the rotation transmission device improves.

What is claimed is:

1. A rotation transmission device comprising an input member, an output member provided around said input member through a bearing disposed at one end of said output member so as to be rotatable relative to said input member, a two-way clutch disposed between said input member and said output member, and an electromagnetic clutch disposed between said input member and said output member for selectively engaging and disengaging said two-way clutch, said two-way clutch being a mechanical clutch comprising a plurality of engaging elements, a retainer for retaining said engaging elements, and a switch spring biasing said retainer toward a neutral position where said engaging elements are not in engagement with at least one of said input member and said output member, said electromagnetic clutch comprising an armature coupled to said retainer so as to be non-rotatable but axially movable relative to said retainer, a rotor fixed to said output member so as to be non-rotatable relative to said output member and to axially face said armature, and an electromagnet axially facing said armature with said rotor disposed between said electromagnet and said armature, said electromagnet being selectively energized to pull said armature toward said electromagnet until said armature is pressed against said rotor, said input member being formed with an oil supply passage having an outlet port directly or indirectly communicating with a space defined between said two-way clutch and said electromagnetic clutch, whereby oil is supplied through said oil supply passage and said outlet port into said space to lubricate said two-way clutch, said rotation transmission device further including a pressure rise suppressor for preventing a rise in the pressure of oil supplied into said space through said oil supply passage.

2. The rotation transmission device of claim 1 wherein said outlet port communicates with said space through an oil passage defined between an outer peripheral surface of said input member and an inner peripheral surface of said rotor, said pressure rise suppressor comprising a restricted portion of said oil passage, said restricted portion being provided between said outlet port and said space and having a reduced sectional area.

3. The rotation transmission device of claim 2 further comprising a needle roller bearing mounted in said oil passage between said outlet port and said space for keeping said input member and said rotor rotatable relative to each other, said needle roller bearing including an outer ring having a flange extending toward the outer peripheral surface of said input shaft, wherein said restricted portion is a gap defined between a radially inner edge of said flange and the outer peripheral surface of said input shaft.

4. The rotation transmission device of claim 2 wherein said rotor includes an annular projection protruding from the inner peripheral surface of said rotor toward the outer peripheral surface of said input shaft, wherein said restricted portion is a gap defined between a radially inner edge of said projection and the inner peripheral surface of said input shaft.

5. The rotation transmission device of claim 1 wherein said pressure rise suppressor comprises an oil discharge port formed in said output member and communicating with said space, said oil discharge port having a greater diameter than said outlet port.

* * * * *